United States Patent
Nie et al.

(10) Patent No.: US 12,299,902 B2
(45) Date of Patent: May 13, 2025

(54) METHOD, ELECTRONIC DEVICE, AND COMPUTER PROGRAM PRODUCT FOR PROCESSING VIDEO

(71) Applicant: Dell Products L.P., Round Rock, TX (US)

(72) Inventors: Yuhong Nie, Shanghai (CN); Tianxiang Chen, Shanghai (CN); Sanping Li, Beijing (CN); Anzhou Hou, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 367 days.

(21) Appl. No.: 17/668,537

(22) Filed: Feb. 10, 2022

(65) Prior Publication Data

US 2023/0237675 A1    Jul. 27, 2023

(30) Foreign Application Priority Data

Jan. 21, 2022    (CN) .......................... 202210074309.X

(51) Int. Cl.
*G06T 7/246*    (2017.01)
*G06N 3/049*    (2023.01)

(52) U.S. Cl.
CPC ............. *G06T 7/248* (2017.01); *G06N 3/049* (2013.01); *G06T 2207/10016* (2013.01); *G06T 2207/20084* (2013.01)

(58) Field of Classification Search
CPC ........... G06T 7/248; G06T 2207/10016; G06T 2207/20084; G06T 7/20; G06T 2207/30196; G06T 2207/30221; G06N 3/049; G06N 3/044; G06N 3/045;
(Continued)

(56) References Cited

U.S. PATENT DOCUMENTS

2023/0033548 A1\*    2/2023    Takkar .................. G06V 10/25

OTHER PUBLICATIONS

"Michael Hopkins et. al., Spiking Neural Networks for Computer Vision, May 2018, Interface Focus, vol. 8, Issue 4, the Royal Society" (Year: 2018).\*

(Continued)

*Primary Examiner* — Chineyere Wills-Burns
*Assistant Examiner* — Phuong Hau Cai
(74) *Attorney, Agent, or Firm* — Ryan, Mason & Lewis, LLP

(57) ABSTRACT

Embodiments of the present disclosure relate to a method, an electronic device, and a computer program product for processing a video. The method includes acquiring a video, where the video includes at least a current frame and a previous frame that are adjacent to each other. The method further includes determining, based on a first pixel value of a pixel in the current frame and a second pixel value of a corresponding pixel in the previous frame, whether the current frame has changed relative to the previous frame. The method further includes determining availability of the current frame for a computer vision task if it is determined that the current frame has changed relative to the previous frame. With the method, video data that needs to be processed is reduced, the task load of a computing device is lowered, system power consumption is improved, and data processing efficiency is improved.

20 Claims, 4 Drawing Sheets

(58) Field of Classification Search
CPC ........ G06N 3/063; G06N 3/08; H04N 19/172; H04N 19/182
See application file for complete search history.

(56) References Cited

OTHER PUBLICATIONS

"Lukas Paulun et. al., A Retinotopic Spiking Neural Network System for Accurate Recognition of Moving Objects Using Neucube and Dynamic Vision Sensors, Jun. 2018, Methods Article, Front. Comput. Neurosci, Part of the Research Topic Integrating Visual System Mechanisms, Computational Models and." (Year: 2018).*

"Hong Jiang Zhang et. al., An Integrated System for Content-Based Video Retrieval and Browsing, Jul. 1996, Pattern Recognition, vol. 30, No. 4, pp. 643-658" (Year: 1996).*

"Xiang Yan et. al., Self-Supervised Learning to Detect Key Frames in Videos, Nov. 2020, Optical Sensors, 20(23), 6941" (Year: 2020).*

Wikipedia, "Biological Neuron Model," https://en.wikipedia.org/wiki/Biological_neuron_model#Leaky_integrate-and-fire, Jan. 29, 2022, 24 pages.

Wikipedia, "Spiking Neural Network," https://en.wikipedia.org/w/index.php?title=Spiking_neural_network&oldid=, Jan. 20, 2022, 9 pages.

* cited by examiner

METHOD, ELECTRONIC DEVICE, AND COMPUTER PROGRAM PRODUCT FOR PROCESSING VIDEO

RELATED APPLICATION(S)

The present application claims priority to Chinese Patent Application No. 202210074309.X, filed Jan. 21, 2022, and entitled "Method, Electronic Device, and Computer Program Product for Processing Video," which is incorporated by reference herein in its entirety.

FIELD

Embodiments of the present disclosure relate to the field of data processing, and more particularly, to a method, an electronic device, and a computer program product for processing a video.

BACKGROUND

With the development of computer technology in recent years, more and more research has been done in the field of artificial intelligence. Due to the rapid development of artificial intelligence, various artificial intelligence devices are increasingly used in people's lives.

In the field of artificial intelligence technology, computer vision technology is a very important part. Computer vision is a simulation of biological vision using computers and related devices, and its main task is to obtain three-dimensional information of corresponding scenes by processing collected pictures or videos, just as humans and many other creatures do every day. Computer vision tasks mainly include image classification, target detection, target tracking, and image segmentation. Although computer vision technology has made some progress, there are still many problems to be solved in the process of its development.

SUMMARY

Embodiments of the present disclosure provide a method, an electronic device, and a computer program product for processing a video.

According to a first aspect of the present disclosure, a method for processing a video is provided. The method includes acquiring a video, where the video includes at least a current frame and a previous frame that are adjacent to each other. The method further includes determining, based on a first pixel value of a pixel in the current frame and a second pixel value of a corresponding pixel in the previous frame, whether the current frame has changed relative to the previous frame. The method further includes determining availability of the current frame for a computer vision task if it is determined that the current frame has changed relative to the previous frame.

According to a second aspect of the present disclosure, an electronic device is provided. The electronic device includes at least one processor; and a memory coupled to the at least one processor and having instructions stored therein, wherein the instructions, when executed by the at least one processor, cause the device to perform actions including: acquiring a video, where the video includes at least a current frame and a previous frame that are adjacent; determining, based on a first pixel value of a pixel in the current frame and a second pixel value of a corresponding pixel in the previous frame, whether the current frame has changed relative to the previous frame; and determining availability of the current frame for a computer vision task if it is determined that the current frame has changed relative to the previous frame.

According to a third aspect of the present disclosure, a computer program product is provided. The computer program product is tangibly stored on a non-transitory computer-readable medium and includes machine-executable instructions. The machine-executable instructions, when executed by a machine, cause the machine to perform any steps of the method according to the first aspect of the present disclosure.

BRIEF DESCRIPTION OF THE DRAWINGS

The above and other objectives, features, and advantages of the present disclosure will become more apparent from the description herein of example embodiments of the present disclosure, with reference to the accompanying drawings. In the example embodiments of the present disclosure, identical reference numerals generally represent identical parts.

In the drawings, identical or corresponding numerals represent identical or corresponding parts.

DETAILED DESCRIPTION

Figure 1:
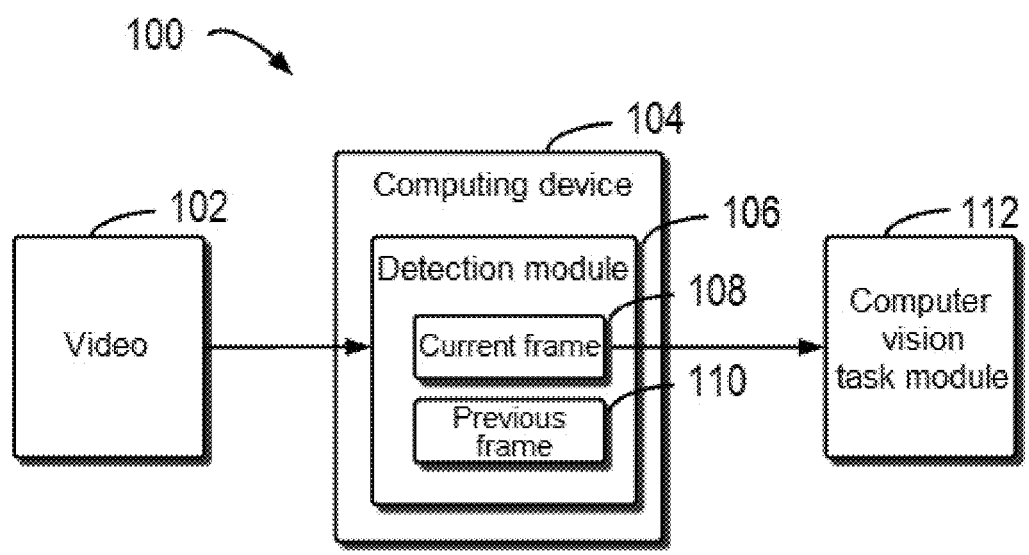
FIG. 1 is a schematic diagram of an example environment in which a device and/or a method can be implemented according to an embodiment of the present disclosure.

Embodiments of the present disclosure will be described in more detail below with reference to the accompanying drawings. Although the drawings show some embodiments of the present disclosure, it should be understood that the present disclosure can be implemented in various forms, and should not be construed as being limited to the embodiments described herein. Instead, these embodiments are provided to allow those skilled in the art to more thoroughly and completely understand the present disclosure. It should be understood that the accompanying drawings and embodiments of the present disclosure are merely for exemplary purposes, and are not used to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

As stated above, computer vision is a widely used technology in the field of artificial intelligence. Under conventional practice, complex computer vision tasks are generally processed in real-time scenarios through deep learning techniques. However, these computer vision tasks are usually heavyweight because they are required to process large amounts of data through complex neural network models.

For example, in a scene of analyzing a training status of a rowing athlete, the training scene is usually monitored in real time, and a monitoring video is transmitted to motion detection and motion analysis tasks in real time for analyzing the motion accuracy and training performance of the athlete to improve the training of the athlete. However, in the above scene, a conventional solution typically transmits collected video data directly to a computing device to execute a computer vision task. However, in actual scenes, some situations will often occur, such as the entire area has no change, or an unmanned area has no change. Since computer vision tasks for motion detection and analysis tasks are all based on deep learning models and computationally intensive, when the tasks are executed in a non-selected mode of the video stream data, the calculation of these unimportant video data will cause unnecessary system load and power consumption, so that the system load will remain high and also cause high power consumption.

In order to solve at least the above and other potential problems, embodiments of the present disclosure provide a method for processing video data. In the method, a computing device acquires a video which includes at least a current frame and a previous frame that are adjacent to each other. The computing device then determines, based on a first pixel value of a pixel in the current frame and a second pixel value of a corresponding pixel in the previous frame, whether the current frame has changed relative to the previous frame. The computing device then determines availability of the current frame for a computer vision task if it is determined that the current frame has changed relative to the previous frame. With the method, the amount of video data that needs to be processed is reduced, the task load of the computing device is lowered, the system power consumption is improved, and the data processing efficiency is improved.

Embodiments of the present disclosure will be further described in detail with reference to the accompanying drawings below. FIG. 1 is a schematic diagram of an example environment 100 in which embodiments of the present disclosure can be implemented.

Example environment 100 includes video 102, computing device 104, and computer vision task module 112. Computing device 104 is configured to determine, before sending video 102 to computer vision task module 112, which frames in video 102 need to be transmitted to computer vision task module 112.

In environment 100, video 102 is a video collected for a computer vision task to be executed by computer vision task module 112. For example, for a computer vision task used to analyze training of an athlete, video 102 is a video collected from a scene of the athlete training. Video 102 may be a data stream collected in real time by a sensor such as a camera, or a video that has been acquired by a sensor.

Computing device 104 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Computing device 104 receives video 102. Computing device 104 includes detection module 106. Detection module 106 is configured to determine whether current frame 108 in video 102 needs to be transmitted to computer vision task module 112 for computer vision task processing.

In some embodiments, detection module 106 is configured to detect whether current frame 108 has changed relative to adjacent previous frame 110. If the current frame 108 has changed relative to the adjacent previous frame 110, it indicates that a detected scene has changed, and current frame 108 is sent to computer vision task module 112 for processing. If no, it indicates that no monitored object is moving. Therefore, the current frame does not need to be transmitted to computer vision task module 112. Alternatively or additionally, the function of detection module 106 to detect frame changes can be implemented by a change detection model thereof, where the change detection model comprises a Spiking Neural Network (SNN) model trained to detect frame changes based on input adjacent video frames. An SNN has the characteristics of low power consumption and high speed in continuous dynamic scenes due to the sparse network, pulse integration and the threshold-based variable membrane potential processing mechanism of the SNN.

In some embodiments, in addition to detecting whether current frame 108 has changed relative to adjacent previous frame 110, detection module 106 further detects whether current frame 108 contains a target object for a computer vision task when current frame 108 has changed. For example, in the case of monitoring an athlete who is rowing, the detection module 106 detects whether there is an athlete and a boat in the current frame with changes. The current frame is sent to computer vision task module 112 only when there is a target object to be monitored in current frame 108. Alternatively or additionally, in an example, the function for detecting a target object in detection module 106 may be implemented by a trained convolutional neural network model, also referred to herein as a CNN model. In another example, the function for detecting a target object in detection module 106 may be implemented by any suitable trained model and method, such as detecting the target object by means of other network models or image comparison. The above examples are intended to describe the present disclosure only and are not specific limitations to the present disclosure.

If current frame 108 needs to be sent to computer vision task module 112, computer vision task module 112 executes computer vision task processing. For example, for a computer vision task of monitoring training of an athlete, motion detection and motion analysis needs to be performed on an image. For frames with no change in content and/or no target object for the computer vision task, no computer vision task processing is performed.

FIG. 1 illustrates that computer vision task module 112 is located outside computing device 104. However, this is only an example, and not a specific limitation to the present disclosure. In another example, computer vision task module 112 is located in computing device 104.

Figure 2:
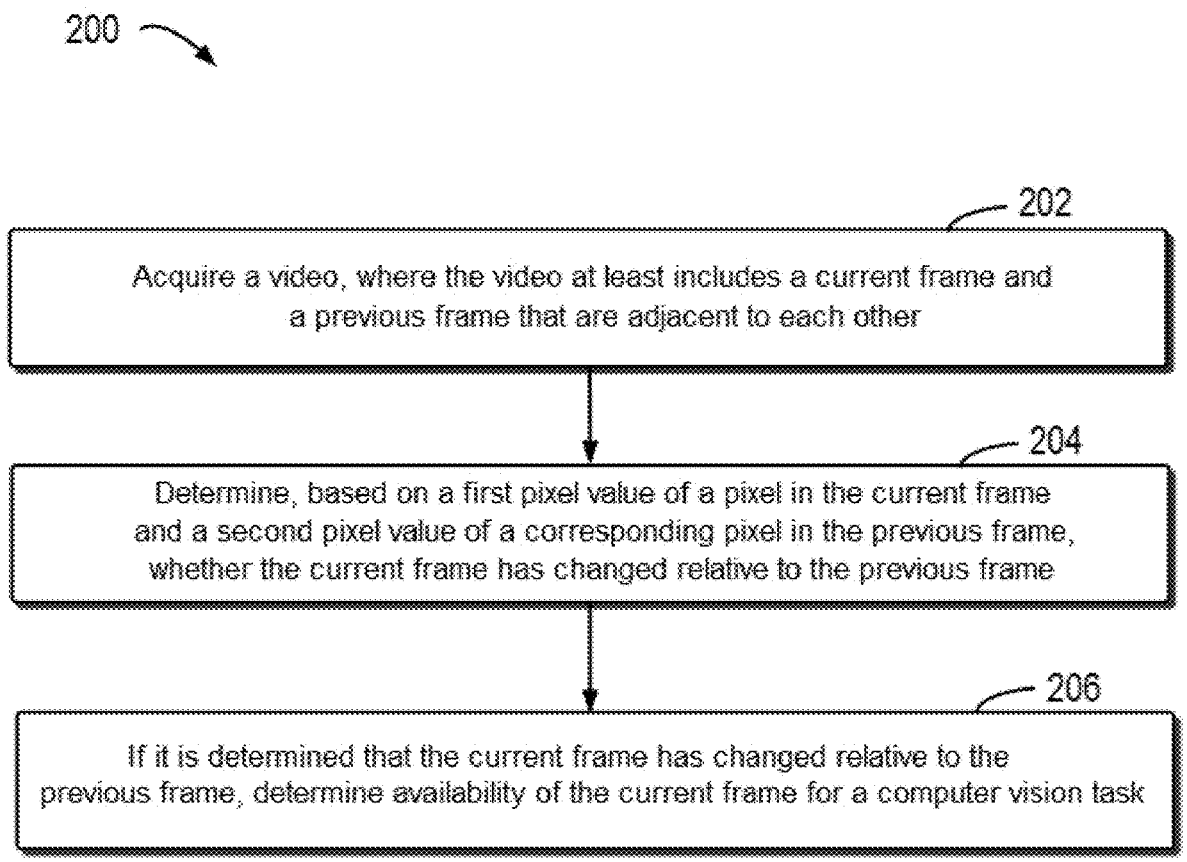
FIG. 2 is a flowchart of a method for processing a video according to an embodiment of the present disclosure.

A block diagram of example environment 100 in which embodiments of the present disclosure can be implemented has been described above with reference to FIG. 1. A flowchart of a method 200 for processing video data according to an embodiment of the present disclosure will be described below with reference to FIG. 2. Method 200 may be executed at computing device 104 in FIG. 1 or any suitable computing device.

At block 202, computing device 104 acquires video 102, where video 102 includes at least current frame 108 and previous frame 110 that are adjacent to each other. Video 102 is a video in a scene that needs to be processed by a computer vision task, so video 102 is related to the computer vision task. For example, the video may be a video acquired from a training scene of an athlete, and the computer vision task is configured to analyze a training status of the athlete.

At block 204, computing device 104 determines, based on a first pixel value of a pixel in current frame 108 and a second pixel value of a corresponding pixel in previous frame 110, whether the current frame has changed relative to the previous frame. Computing device 104 will process the video frame by frame after receiving video 102. After receiving the current frame, computing device 104 detects frame changes based on a pixel value of a pixel in the current frame and a pixel value of a corresponding pixel in the adjacent previous frame. Description will be given below for the corresponding pixels in the current frame and the previous frame.

In some embodiments, computing device 104 acquires the first pixel value and the second pixel value. Then, computing device 104 converts the first pixel value and the second pixel value into a first pulse array and a second pulse array. After the conversion is completed, computing device 104 determines whether the first pulse array is the same as the second pulse array. If the first pulse array is different from the second pulse array, computing device 104 determines that the current frame has changed relative to the previous frame. If it is determined that the first pulse array is the same as the second pulse array, computing device 104 determines that the current frame has not changed relative to the previous frame. In this way, it can be quickly determined whether a frame has changed, the amount of calculation is reduced, and the processing efficiency is improved.

In some embodiments, computing device 104 compares the acquired first pulse array and second pulse array to determine whether the current frame has changed.

In some embodiments, in determining whether the current frame has changed relative to the previous frame, computing device 104 inputs the first pixel value and the second pixel value into a change detection model to determine whether the current frame has changed relative to the previous frame. The change detection model may be an SNN model trained to detect frame changes based on input adjacent video frames. With regard to the SNN model, the description of FIG. 4 can be referenced.

In some embodiments, if the current frame has not changed relative to the previous frame, computing device 104 determines that the current frame is not available for a computer vision task. In this way, the amount of data that needs to be processed by the computer vision task can be reduced.

At block 206, if it is determined that the current frame has changed relative to the previous frame, computing device 104 determines the availability of the current frame for the computer vision task. After it is determined that the current frame has changed, it can be directly determined that the current frame is available for the computer vision task or it can be further determined whether the current frame is available for the computer vision task.

In some embodiments, if it is determined that the current frame has changed relative to the previous frame, computing device 104 directly determines that the current frame is available for the computer vision task. In this way, frames that have not changed may not be processed, thereby reducing the amount of data processing.

In some embodiments, after it is determined that the current frame has changed relative to the previous frame, computing device 104 further needs to detect whether the current frame has a target object used for the computer vision task. If it is determined that the current frame has the target object, computing device 104 determines that the current frame is available for the computer vision task. If it is determined that the current frame does not have the target object, it is determined that the current frame is not available for the computer vision task. For example, in an athlete rowing scene, only image frames including target objects such as an athlete and a boat are used for further processing, and frames that do not include target objects but have changed are filtered out. In this way, only frames related to the target object can be selected for processing, which reduces the amount of data processing.

A block diagram of method 200 for processing a video according to an embodiment of the present disclosure has been described above with reference to FIG. 2. A flowchart of an example process 300 for processing a video according to an embodiment of the present disclosure will be described below with reference to FIG. 3. Process 300 may be executed at computing device 104 in FIG. 1 or any suitable computing device.

Camera 302 acquires video 304 of a scene that needs to be monitored, such as a real-time video data stream. Then, video 304 is transmitted to lightweight object detection module 306. Lightweight object detection module 306 is mainly configured to select a video frame from video 304 that needs to be input to heavyweight computer vision task module 316.

After video 304 is input to lightweight object detection module 306, object detection is performed on a current frame at block 308. The object detection process is implemented by applying a video to an SNN filter 310. An example of the SNN filter will be described in detail in FIG. 4. If a detected object is output, it is determined at block 312 whether the detected object in the current frame is a target object. If a target object is detected, the video frame is sent to heavyweight computer vision task module 316 for processing. If no target object is detected, no operation is performed on the current video frame, as indicated at block 314.

For example, in a scene of monitoring movement of a rowing athlete, the target object may be set as the athlete and the boat. Only when a target object is detected by SNN filter 310, are subsequent action detection and action analysis performed by heavyweight computer vision task module 316. If the athlete and the boat are not detected, it indicates that no athlete is training in the current video frame, and at this time, the video frame does not need to be processed. In this way, the working load is reduced, and the data processing efficiency is improved.

Figure 3:
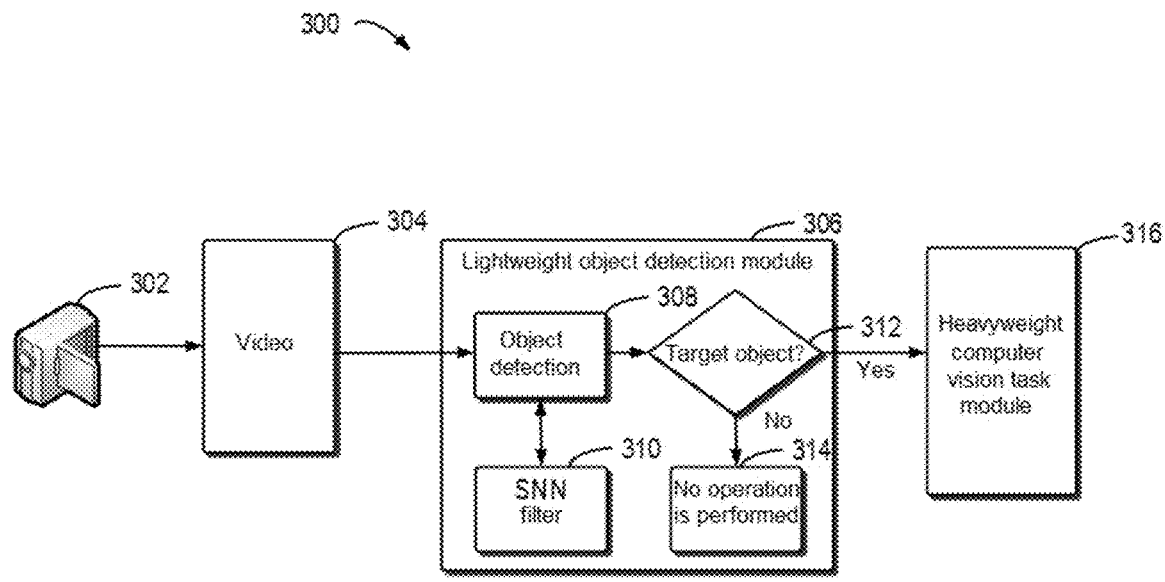
FIG. 3 is a schematic diagram of an example process for processing a video according to an embodiment of the present disclosure.

SNN filter 310 shown in FIG. 3 is configured to output an object in the current video frame or mark the current frame as not required for processing. When detecting the object in the current video frame, SNN filter 310 first determines whether the current video frame has changed relative to a previous video frame, and detects the object in the current video frame only when the current video frame has changed.

As another example, lightweight object detection module 306 may only include a function of SNN filter 310 for detecting whether the current video frame has changed relative to the adjacent previous video frame, and determine, only by whether the video frame has changed, whether to send the current video frame to heavyweight computer vision task module 316. If the current video frame has changed, it is sent to heavyweight computer vision task module 316. If the current video frame has not changed, it does not need to be sent to heavyweight computer vision task module 316. At this time, there is no need to detect whether there is an object in the current video frame and to determine whether the object is the target object. The above examples are intended to describe the present disclosure only and are not specific limitations to the present disclosure.

With the method, the amount of video data that needs to be processed is reduced, the task load of the computing device is lowered, the system power consumption is improved, and the data processing efficiency is improved.

A block diagram of process 300 for processing a video according to an embodiment of the present disclosure has been described above with reference to FIG. 3. An example 400 of an SNN filter according to an embodiment of the present disclosure will be described below with reference to FIG. 4.

Figure 4:
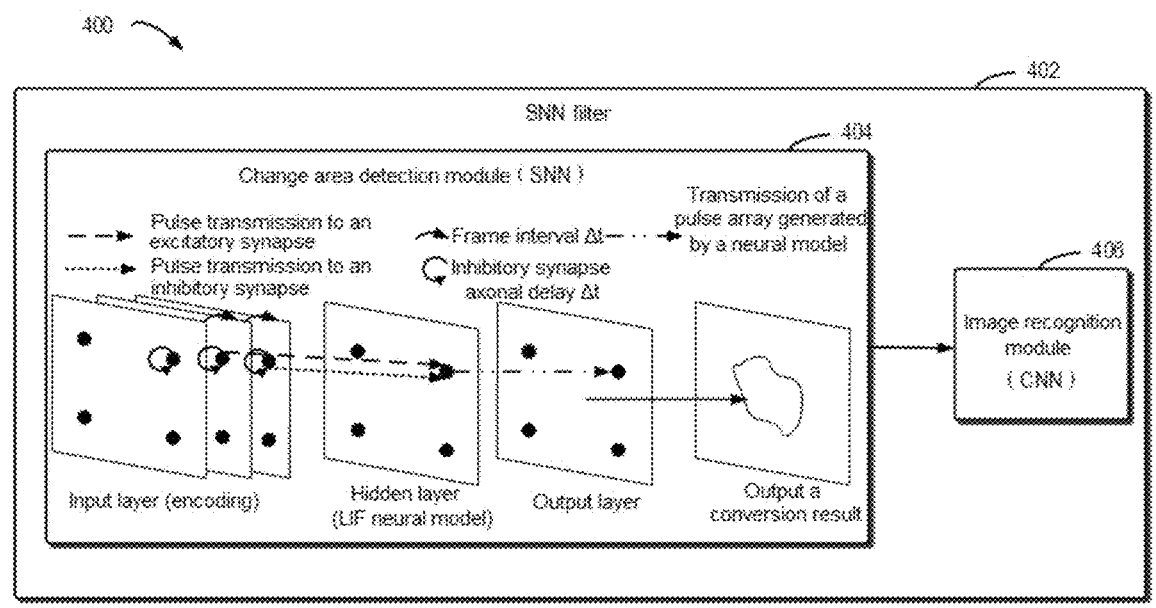
FIG. 4 is a schematic diagram of an example Spiking Neural Network (SNN) filter according to an embodiment of the present disclosure.

As shown in FIG. 4, SNN filter 402 includes change area detection module 404 and image recognition module 406. Change area detection module 404 is implemented by a trained SNN model. For the SNN model, as shown in FIG. 4, it is constructed as including an input layer, a hidden layer, and an output layer. FIG. 4 shows a hidden layer, which is only an example and does not specifically limit the present disclosure. Those skilled in the art may set the number of the hidden layers and the structure of the SNN according to needs. The trained SNN model is obtained through training by using a sample video as input and a sample change area as output. Image recognition module 406 is implemented by a trained convolutional neural network (CNN) model. Image recognition module 406 is obtained through training by using a sample image as input and an object in a marked image as sample output.

In the SNN model, an input layer receives a video frame and encodes a pixel value of a pixel in the video frame as a pulse array. In some embodiments, the pixel value is represented as a binary value array, where 1 means that there is a pulse, and 0 means no pulse. In some other embodiments, the pixel value is mapped to any suitable array to form a pulse array.

In the SNN model, an interval of transmitting video frames is At. In addition, neurons corresponding to the pixels of a video frame are constructed in the hidden layer of the SNN model. Each neuron includes two receiving ends and an output end. One receiving end of the neuron is an excitatory synapse, and the other is an inhibitory synapse. The excitatory synapse is configured to receive a pulse array of a pixel of the current frame, and the inhibitory synapse is configured to receive a pulse array of a pixel of the same position in an adjacent previous frame. The pulse array of the pixel of the same position in the adjacent previous frame is first sent to the excitatory synapse of the neuron after the previous frame enters the input layer, and then sent, after the time of At, to the inhibitory synapse of the neuron after the current frame is received. With this setting, the pulse array of one pixel of the current frame and the pulse array of one pixel of the same position of the previous frame arrive at the neuron at the same time, and the neuron generates a pulse array based on the received pulse array of the pixel of the current frame and the received pulse array of the pixel of the previous frame. When pixel values of the same pixel position of the two adjacent frames have not changed, since the two pulse arrays received from the excitatory and inhibitory synapses cancel each other out, the neuron cannot form a pulse that exceeds a membrane potential. At this time, no output is generated. When the pixel values of the same pixel position of the two adjacent frames change, a pulse array is output in the output layer. Then, the pulse array obtained in the output layer is decoded with a decoding method corresponding to the encoding method in the input layer to obtain an area with pixel values. If there is an area with pixel values, it indicates that the current frame has changed. Then, the current frame is marked as a frame with changes, and the current frame is then input to image recognition module 406 for object recognition. If the current frame is marked as unchanged, no image recognition processing is performed on the current frame. Image recognition module 406 is a convolutional neural network model trained for recognizing objects. In some embodiments, as stated above, lightweight object detection module 306 in FIG. 3 may only include a change area detection module SNN.

As indicated previously, with the method, the amount of video data that needs to be processed is reduced, the task load of the computing device is lowered, the system power consumption is improved, and the data processing efficiency is improved.

Figure 5:
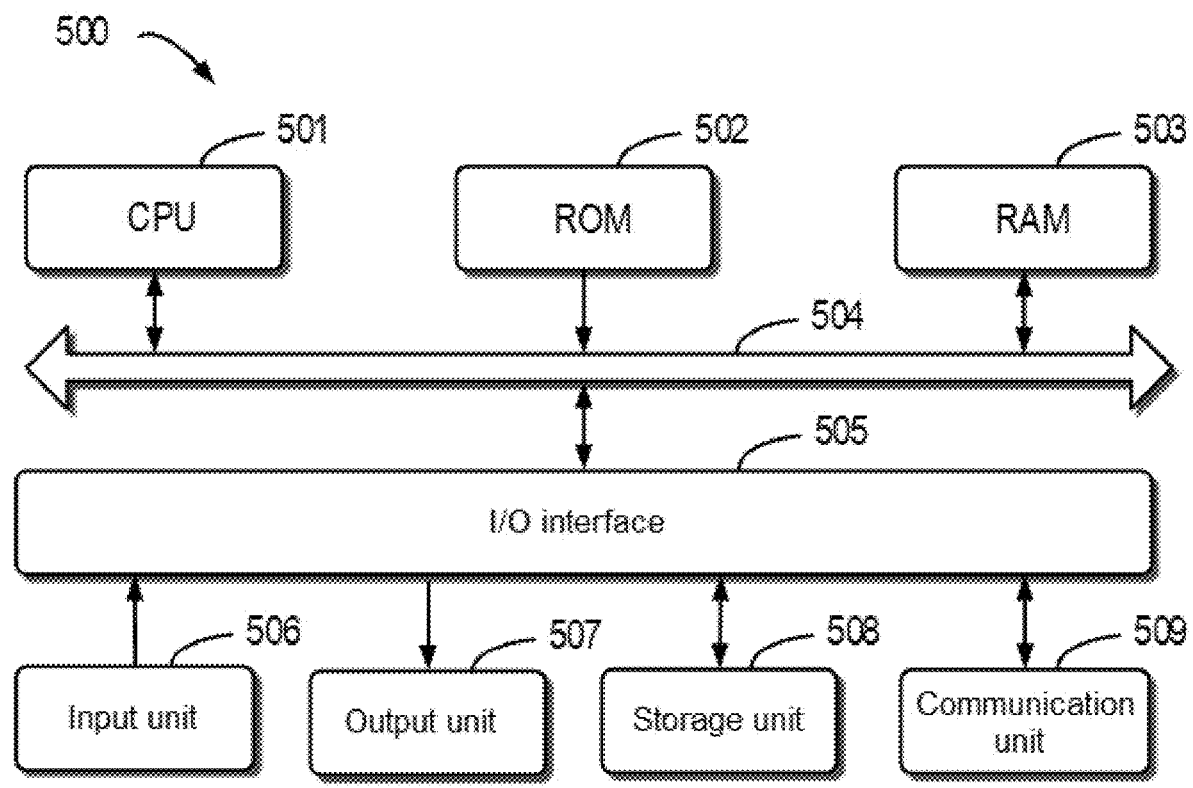
FIG. 5 is a schematic block diagram of an example device suitable for implementing embodiments of the content of the present disclosure.

FIG. 5 is a schematic block diagram of an example device 500 that may be used to implement embodiments of the present disclosure. Computing device 104 in FIG. 1 may be implemented by device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

CPU 501 may perform the various processes and processing described above, such as method 200 and process 300. For example, in some embodiments, method 200 and process 300 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more actions of method 200 and process 300 described above may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the "C" language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to embodiments of the present disclosure. It should be understood that each block of the flowcharts and/or the block diagrams and combinations of blocks in the flowcharts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flowcharts as well as a combination of blocks in the block diagrams and/or flowcharts may be implemented by using a special hardware-based system that executes specified functions or actions, or implemented using a combination of special hardware and computer instructions.

Embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method comprising:
acquiring a video, in a first stage of a multi-stage video processing system executing on processor and memory resources of at least one computing device, the multi-stage video processing system comprising a plurality of separate sequential processing stages including the first stage and at least a second stage following the first stage, wherein the video comprises at least a current frame and a previous frame that are adjacent to each other;

determining, in the first stage of the multi-stage video processing system and based on a first pixel value of a pixel in the current frame and a second pixel value of a corresponding pixel in the previous frame, whether the current frame has changed relative to the previous frame, the determining of whether the current frame has changed relative to the previous frame being performed at least in part by at least one neural network of the first stage of the multi-stage video processing system;

determining, in the first stage of the multi-stage video processing system, availability of the current frame for a computer vision task that is implemented in the second stage of the multi-stage video processing system, by determining in the neural network of the first stage, utilizing pulse arrays generated as respective encodings of the first and second pixel values, whether or not the current frame has changed relative to the previous frame, wherein the current frame is determined as available for the computer vision task responsive to the current frame having changed relative to the previous frame, and the current frame is determined as not available for the computer vision task responsive to the current frame not having changed relative to the previous frame; and controlling utilization of the second stage to perform the computer vision task for the current frame based on the determined availability of the current frame, wherein controlling utilization of the second stage to perform the computer vision task for the current frame comprises utilizing the second stage to perform the computer vision task for the current frame responsive to the current frame being determined as available, and bypassing utilization of the second stage to perform the computer vision task for the current frame responsive to the current frame being determined as not available;

wherein performance of the computer vision task implemented in the second stage is selectively bypassed for the current frame responsive to the controlling based on the determined availability of the current frame, to reduce a power consumption of the multi-stage video processing system in processing the video.

2. The method according to claim 1, wherein determining whether the current frame has changed relative to the previous frame comprises:

acquiring the first pixel value and the second pixel value;

converting the first pixel value and the second pixel value into a first pulse array and a second pulse array; and determining, responsive to determining that the first pulse array is different from the second pulse array, that the current frame has changed relative to the previous frame.

3. The method according to claim 2, wherein determining whether the current frame has changed relative to the previous frame further comprises:

determining, responsive to determining that the first pulse array is the same as the second pulse array, that the current frame has not changed relative to the previous frame.

4. The method according to claim 1, wherein determining whether the current frame has changed relative to the previous frame comprises:

inputting the first pixel value and the second pixel value to a change detection model to determine whether the current frame has changed relative to the previous frame, wherein the change detection model comprises a Spiking Neural Network (SNN) model trained to detect frame changes based on input adjacent video frames.

5. The method according to claim 1, further comprising:

determining, responsive to determining that the current frame has not changed relative to the previous frame, that the current frame is not available for the computer vision task.

6. The method according to claim 1, wherein determining the availability of the current frame for a computer vision task comprises:

detecting, responsive to determining that the current frame has changed relative to the previous frame, whether the current frame has a target object used for the computer vision task; and determining, responsive to determining that the current frame has the target object, that the current frame is available for the computer vision task.

7. The method according to claim 6, wherein determining the availability of the current frame for a computer vision task further comprises:

determining, responsive to determining that the current frame does not have the target object, that the current frame is not available for the computer vision task.

8. The method according to claim 1, wherein determining the availability of the current frame for a computer vision task comprises:

determining, responsive to determining that the current frame has changed relative to the previous frame, that the current frame is available for the computer vision task.

9. An electronic device, comprising:

at least one processor; and a memory coupled to the at least one processor and having instructions stored therein, wherein the instructions, when executed by the at least one processor, cause the electronic device to perform actions comprising:

acquiring a video, in a first stage of a multi-stage video processing system implemented by the at least one processor and the memory of the electronic device, the multi-stage video processing system comprising a plurality of separate sequential processing stages including the first stage and at least a second stage following the first stage, wherein the video comprises at least a current frame and a previous frame that are adjacent to each other;

determining, in the first stage of the multi-stage video processing system and based on a first pixel value of a pixel in the current frame and a second pixel value of a corresponding pixel in the previous frame, whether the current frame has changed relative to the previous frame, the determining of whether the current frame has changed relative to the previous frame being performed at least in part by at least one neural network of the first stage of the multi-stage video processing system;

determining, in the first stage of the multi-stage video processing system, availability of the current frame for a computer vision task that is implemented in the second stage of the multi-stage video processing system, by determining in the neural network of the first stage, utilizing pulse arrays generated as respective encodings of the first and second pixel values, whether or not the current frame has changed relative to the previous frame, wherein the current frame is determined as available for the computer vision task responsive to the current frame having changed relative to the previous frame, and the current frame is determined as not available for the computer vision task responsive to the current frame not having changed relative to the previous frame; and controlling utilization of the second stage to perform the computer vision task for the current frame based on the determined availability of the current frame, wherein controlling utilization of the second stage to perform the computer vision task for the current frame comprises utilizing the second stage to perform the computer vision task for the current frame responsive to the current frame being determined as available, and bypassing utilization of the second stage to perform the computer vision task for the current frame responsive to the current frame being determined as not available;

wherein performance of the computer vision task implemented in the second stage is selectively bypassed for the current frame responsive to the controlling based on the determined availability of the current frame, to reduce a power consumption of the multi-stage video processing system in processing the video.

10. The electronic device according to claim 9, wherein determining whether the current frame has changed relative to the previous frame comprises:

acquiring the first pixel value and the second pixel value;

converting the first pixel value and the second pixel value into a first pulse array and a second pulse array; and determining, responsive to determining that the first pulse array is different from the second pulse array, that the current frame has changed relative to the previous frame.

11. The electronic device according to claim 10, wherein determining whether the current frame has changed relative to the previous frame further comprises:

determining, responsive to determining that the first pulse array is the same as the second pulse array, that the current frame has not changed relative to the previous frame.

12. The electronic device according to claim 9, wherein determining whether the current frame has changed relative to the previous frame comprises:

inputting the first pixel value and the second pixel value to a change detection model to determine whether the current frame has changed relative to the previous frame, wherein the change detection model comprises a Spiking Neural Network (SNN) model trained to detect frame changes based on input adjacent video frames.

13. The electronic device according to claim 9, wherein the actions further comprise:

determining, responsive to determining that the current frame has not changed relative to the previous frame, that the current frame is not available for the computer vision task.

14. The electronic device according to claim 9, wherein determining the availability of the current frame for a computer vision task comprises:

detecting, responsive to determining that the current frame has changed relative to the previous frame, whether the current frame has a target object used for the computer vision task;

determining, responsive to determining that the current frame has the target object, that the current frame is available for the computer vision task.

15. The electronic device according to claim 14, wherein determining the availability of the current frame for a computer vision task further comprises:

determining, responsive to determining that the current frame does not have the target object, that the current frame is not available for the computer vision task.

16. The electronic device according to claim 9, wherein determining the availability of the current frame for a computer vision task comprises:

determining, responsive to determining that the current frame has changed relative to the previous frame, that the current frame is available for the computer vision task.

17. A computer program product that is tangibly stored on a non-transitory computer-readable medium and comprises machine-executable instructions, wherein the machine-executable instructions, when executed by a machine, cause the machine to perform actions comprising:

acquiring a video, in a first stage of a multi-stage video processing system executing on processor and memory resources of the machine, the multi-stage video processing system comprising a plurality of separate sequential processing stages including the first stage and at least a second stage following the first stage, wherein the video comprises at least a current frame and a previous frame that are adjacent to each other;

determining, in the first stage of the multi-stage video processing system and based on a first pixel value of a pixel in the current frame and a second pixel value of a corresponding pixel in the previous frame, whether the current frame has changed relative to the previous frame, the determining of whether the current frame has changed relative to the previous frame being performed at least in part by at least one neural network of the first stage of the multi-stage video processing system;

determining, in the first stage of the multi-stage video processing system, availability of the current frame for a computer vision task that is implemented in the second stage of the multi-stage video processing system, by determining in the neural network of the first stage, utilizing pulse arrays generated as respective encodings of the first and second pixel values, whether or not the current frame has changed relative to the previous frame, wherein the current frame is determined as available for the computer vision task responsive to the current frame having changed relative to the previous frame, and the current frame is determined as not available for the computer vision task responsive to the current frame not having changed relative to the previous frame; and controlling utilization of the second stage to perform the computer vision task for the current frame based on the determined availability of the current frame, wherein controlling utilization of the second stage to perform the computer vision task for the current frame comprises utilizing the second stage to perform the computer vision task for the current frame responsive to the current frame being determined as available, and bypassing utilization of the second stage to perform the computer vision task for the current frame responsive to the current frame being determined as not available;

wherein performance of the computer vision task implemented in the second stage is selectively bypassed for the current frame responsive to the controlling based on the determined availability of the current frame, to reduce a power consumption of the multi-stage video processing system in processing the video.

18. The computer program product according to claim 17, wherein determining whether the current frame has changed relative to the previous frame comprises:
- acquiring the first pixel value and the second pixel value;
- converting the first pixel value and the second pixel value into a first pulse array and a second pulse array; and
- determining, responsive to determining that the first pulse array is different from the second pulse array, that the current frame has changed relative to the previous frame.

19. The computer program product according to claim 18, wherein determining whether the current frame has changed relative to the previous frame further comprises:
- determining, responsive to determining that the first pulse array is the same as the second pulse array, that the current frame has not changed relative to the previous frame.

20. The computer program product according to claim 17, wherein determining whether the current frame has changed relative to the previous frame comprises:
- inputting the first pixel value and the second pixel value to a change detection model to determine whether the current frame has changed relative to the previous frame, wherein the change detection model comprises a Spiking Neural Network (SNN) model trained to detect frame changes based on input adjacent video frames.

\* \* \* \* \*